(12) United States Patent
Lv et al.

(10) Patent No.: US 10,540,114 B2
(45) Date of Patent: Jan. 21, 2020

(54) SYSTEM AND METHOD ACCELERATED RANDOM WRITE LAYOUT FOR BUCKET ALLOCATION WITH IN HYBRID STORAGE SYSTEMS

(71) Applicant: EMC IP Holding Company, LLC, Hopkinton, MA (US)

(72) Inventors: Shuo Lv, Beijing (CN); Wilson Hu, Beijing (CN); Huan Chen, Beijing (CN); Zhiqiang Li, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 47 days.

(21) Appl. No.: 15/883,544

(22) Filed: Jan. 30, 2018

(65) Prior Publication Data
US 2019/0129650 A1    May 2, 2019

(30) Foreign Application Priority Data

Oct. 30, 2017    (CN) .......................... 2017 1 1039911

(51) Int. Cl.
*G06F 3/06* (2006.01)
*G06F 12/02* (2006.01)
*G06F 16/22* (2019.01)

(52) U.S. Cl.
CPC ........ *G06F 3/0656* (2013.01); *G06F 12/0253* (2013.01); *G06F 16/2246* (2019.01)

(58) Field of Classification Search
CPC . G06F 3/0656; G06F 16/2246; G06F 12/0253
USPC .......................................................... 710/52
See application file for complete search history.

(56) References Cited

U.S. PATENT DOCUMENTS

| | | | | |
|---|---|---|---|---|
| 5,813,000 A | * | 9/1998 | Furlani | ................ G11B 27/034 |
| 6,138,123 A | * | 10/2000 | Rathbun | ............. G06F 16/9024 |
| 9,952,765 B2 | * | 4/2018 | Krishnamachari | ... G06F 3/0604 |
| 2013/0191601 A1 | * | 7/2013 | Peterson | ............. G06F 12/0868 |
| | | | | 711/137 |
| 2014/0195720 A1 | * | 7/2014 | Akella | ..................... G06F 16/10 |
| | | | | 711/103 |
| 2014/0310499 A1 | * | 10/2014 | Sundararaman | .... G06F 12/0269 |
| | | | | 711/203 |
| 2015/0052295 A1 | * | 2/2015 | Danilak | .............. G06F 12/0246 |
| | | | | 711/103 |
| 2017/0177222 A1 | * | 6/2017 | Singh | ...................... G06F 3/061 |
| 2017/0220617 A1 | * | 8/2017 | Bortnikov | ........... G06F 16/2329 |
| 2019/0005079 A1 | * | 1/2019 | Li | ....................... G06F 16/2272 |

* cited by examiner

*Primary Examiner* — Paul R. Myers
(74) *Attorney, Agent, or Firm* — Brian J. Colandreo; Mark H. Whittenberger; Holland & Knight LLP

(57) ABSTRACT

A method, computer program product, and computer system for receiving, by a computing device, an I/O request. A bucket for the I/O request may be allocated. An offset and mapping information of the I/O request may be written into a log. The offset and mapping information of the I/O request may be written into a tree structure. Garbage collection for the tree structure may be executed to reuse the bucket.

20 Claims, 10 Drawing Sheets

SYSTEM AND METHOD ACCELERATED RANDOM WRITE LAYOUT FOR BUCKET ALLOCATION WITH IN HYBRID STORAGE SYSTEMS

RELATED APPLICATION

The subject application claims the priority of China Patent Application No. 201711039911.5, filed on 30 Oct. 2017, the contents of which are herein incorporated by reference in its entirety.

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to receiving, by a computing device, an I/O request. A bucket for the I/O request may be allocated. An offset and mapping information of the I/O request may be written into a log. The offset and mapping information of the I/O request may be written into a tree structure. Garbage collection may be executed to reuse the bucket.

One or more of the following example features may be included. The tree structure may include a B+ tree. The B+ tree may include a bkey. The bkey may store the mapping information between the data in the solid state device and the data in a backend device. The allocation of the bucket may be a sequential allocation. It may be determined that overlap exists in the tree structure. The tree structure may be split.

In another example implementation, a computing system may include one or more processors and one or more memories configured to perform operations that may include but are not limited to receiving an I/O request. A bucket for the I/O request may be allocated. An offset and mapping information of the I/O request may be written into a log. The offset and mapping information of the I/O request may be written into a tree structure. Garbage collection for the tree structure may be executed to reuse the bucket.

One or more of the following example features may be included. The tree structure may include a B+ tree. The B+ tree may include a bkey. The bkey may store the mapping information between the data in the solid state device and the data in a backend device. The allocation of the bucket may be a sequential allocation. It may be determined that overlap exists in the tree structure. The tree structure may be split.

In another example implementation, a computer program product may reside on a computer readable storage medium having a plurality of instructions stored thereon which, when executed across one or more processors, may cause at least a portion of the one or more processors to perform operations that may include but are not limited to receiving an I/O request. A bucket for the I/O request may be allocated. An offset and mapping information of the I/O request may be written into a log. The offset and mapping information of the I/O request may be written into a tree structure. Garbage collection for the tree structure may be executed to reuse the bucket.

One or more of the following example features may be included. The tree structure may include a B+ tree. The B+ tree may include a bkey. The bkey may store the mapping information between the data in the solid state device and the data in a backend device. The allocation of the bucket may be a sequential allocation. It may be determined that overlap exists in the tree structure. The tree structure may be split.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
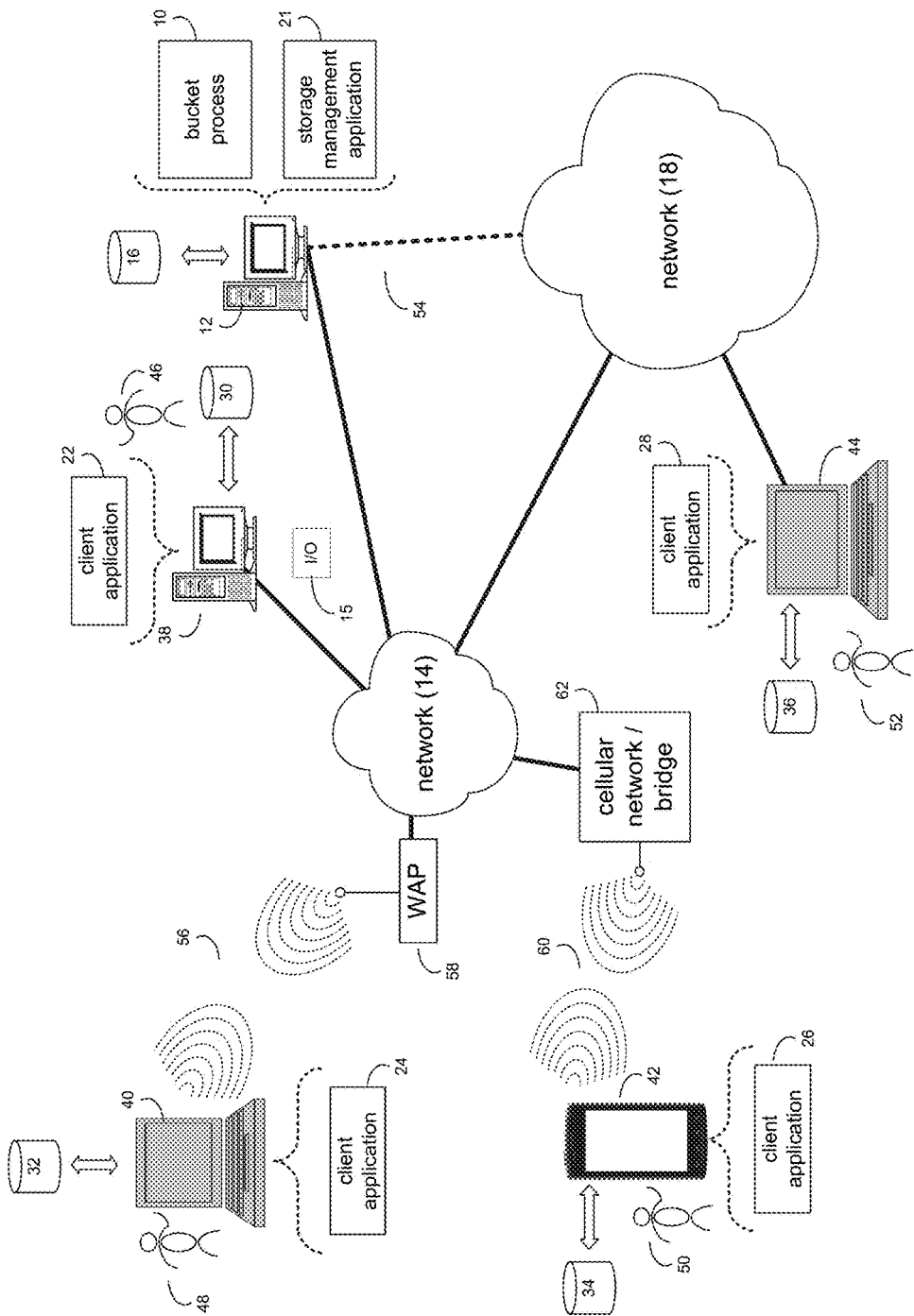
FIG. 1 is an example diagrammatic view of a bucket process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown bucket process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a bucket process, such as bucket process 10 of FIG. 1, may receive, by a computing device, an I/O request (e.g., I/O 15). A bucket for the I/O request may be allocated. An offset and mapping information of the I/O request may be written into a log. The offset and mapping information of the I/O request may be written into a tree structure. Garbage collection for the tree structure may be executed to reuse the bucket.

In some implementations, the instruction sets and subroutines of bucket process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, bucket process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, bucket process 10 and/or storage management application 21 may be accessed via one or more of client applications 22, 24, 26, 28. In some implementations, bucket process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within bucket process 10, a component of bucket process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of bucket process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of bucket process 10 (and vice versa). Accordingly, in some implementations, bucket process 10 may be a purely server-side application, a purely client-side application, or a hybrid server-side/client-side application that is cooperatively executed by one or more of client applications 22, 24, 26, 28 and/or bucket process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, bucket process 10, and storage management application 21, taken singly or in any combination, may effectuate some or all of the same functionality, any description of effectuating such functionality via one or more of client applications 22, 24, 26, 28, bucket process 10, storage management application 21, or combination thereof, and any described interaction(s) between one or more of client applications 22, 24, 26, 28, bucket process 10, storage management application 21, or combination thereof to effectuate such functionality, should be taken as an example only and not to limit the scope of the disclosure.

In some implementations, one or more of users 46, 48, 50, 52 may access computer 12 and bucket process 10 (e.g., using one or more of client electronic devices 38, 40, 42, 44) directly through network 14 or through secondary network 18. Further, computer 12 may be connected to network 14 through secondary network 18, as illustrated with phantom link line 54. Bucket process 10 may include one or more user interfaces, such as browsers and textual or graphical user interfaces, through which users 46, 48, 50, 52 may access bucket process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
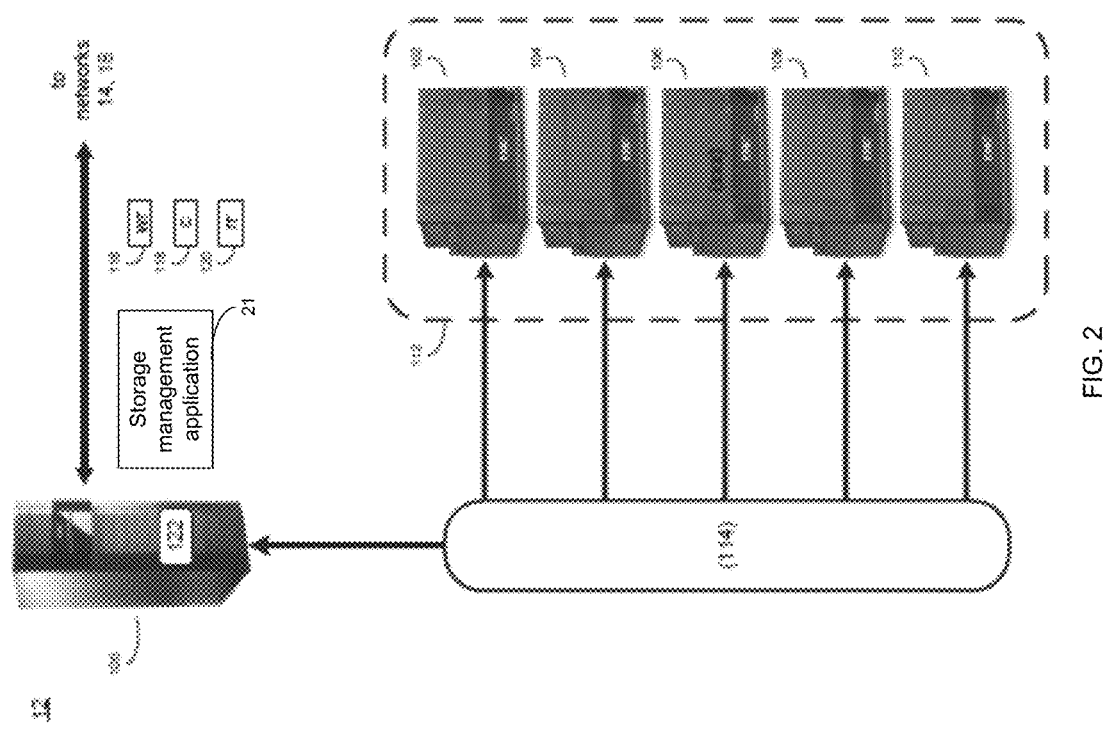
FIG. 2 is an example diagrammatic view of a computer of FIG. 1 according to one or more example implementations of the disclosure.
Figure 3:
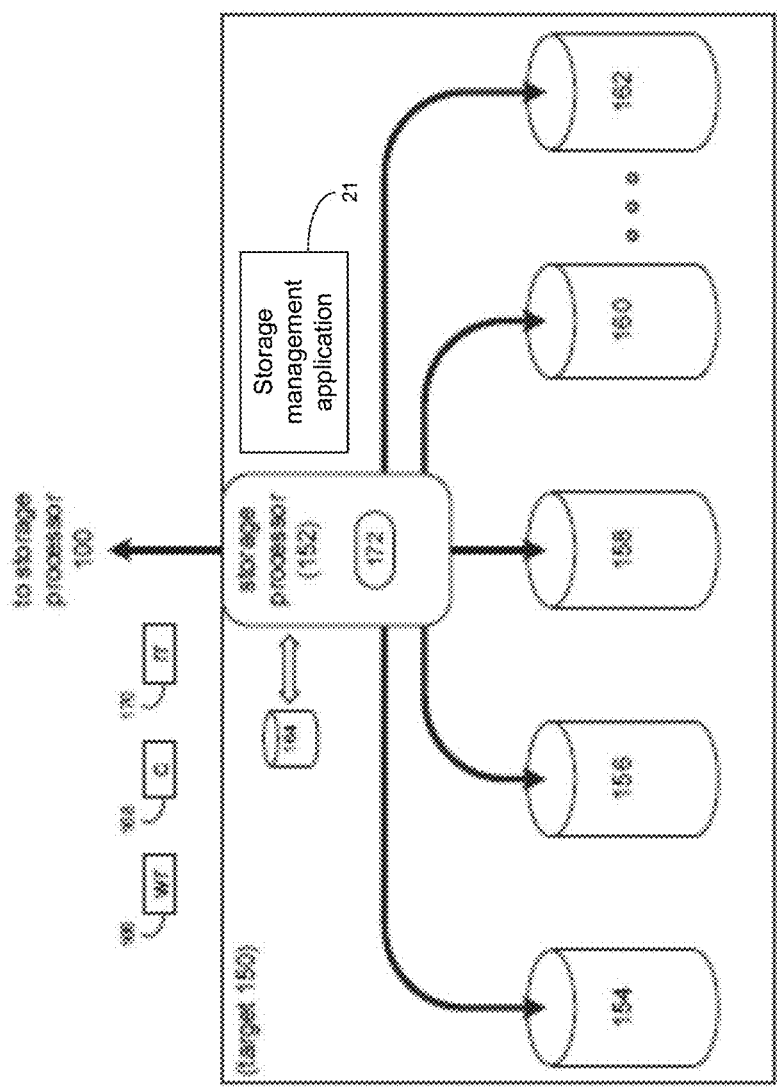
FIG. 3 is an example diagrammatic view of a storage target of FIG. 1 according to one or more example implementations of the disclosure.
Figure 4:
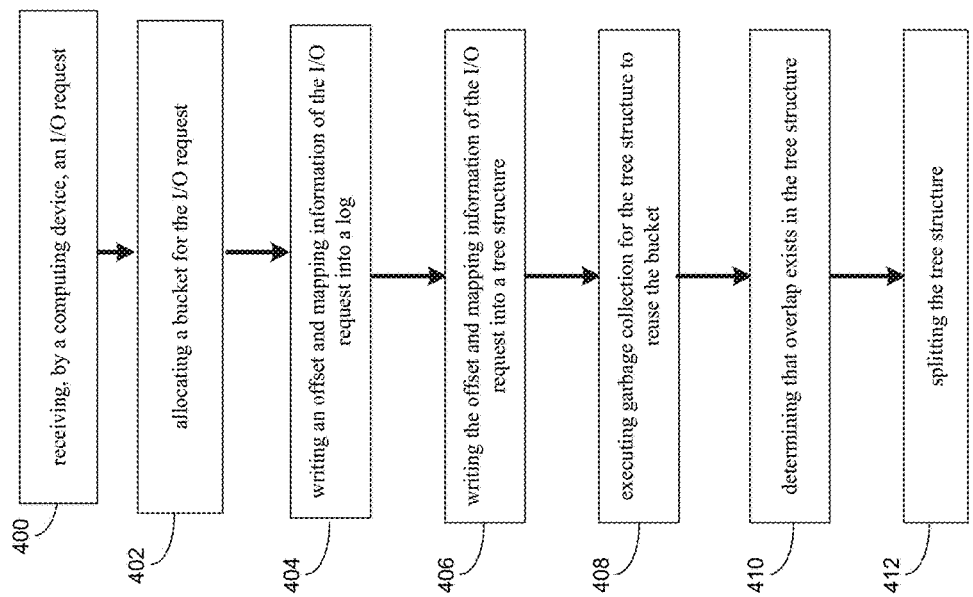
FIG. 4 is an example flowchart of a bucket process according to one or more example implementations of the disclosure.

Data Storage System:

Referring also to the example implementation of FIGS. 2-3 (e.g., where computer 12 may be configured as a data storage system, such as but not limited to the VNX storage system from Dell EMC™), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or bucket process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Generally, the development of storage system may tend to be large capacity, low cost, and high performance. However, any single storage device, such as non-volatile random access memory, disk, SSD, etc., due to its physical characteristics/restrictions, may not always meet the above requirements. Mixed (i.e., hybrid) storage system may make full use of the characteristics of the different storage devices, and may have high efficiency, which may increase storage capacity and keep a low system cost, thereby also improving the performance of storage system.

In some storage systems, solid state drives are typically only used as a hot data cache for HDDs in hybrid storage systems, where the hot data in the SSD may be used to speed up the read access (similar to a Linux page cache mechanism). However, the data organization and data layout may not have typically changed for the SSD. Thus, random write performance may be poor and may introduce too much write amplification, which may reduce the SSD life. Moreover, with increased usage of the storage system, the system performances may be decreased over time, as there may not be any optimization for the SSD in the storage layer. Additionally, I/O delays may be unpredictable, as some I/O delays may be very long, which may sometimes be unacceptable to the user.

As will be discussed below, bucket process to may implement a new hybrid storage system architecture, which may use space allocation based buckets, variable length data block storage modes and extent mapping methods, that may effectively convert random write requests into sequential write requests, and avoid write amplification, and may improve the random write performance of the hybrid storage system. Write requests may be aggregated into, e.g., 1M size write requests to disk, and efficient garbage collection techniques may reduce the write amplification, thereby improving the life of the SSD in hybrid storage systems.

As will be discussed below, bucket process 10 may at least help, e.g., the improvement of an existing storage technology, necessarily rooted in computer technology in order to overcome an example and non-limiting problem specifically arising in the realm of data storage. For instance, bucket process 10 may use an efficient process to avoid write amplification, and may improve the random write performance of the hybrid storage system.

The Bucket Process:

As discussed above and referring also at least to the example implementations of FIGS. 4-9, bucket process 10 may receive 400, by a computing device, an I/O request. Bucket process 10 may allocate 402 a bucket for the I/O request. Bucket process 10 may write 404 an offset and mapping information of the I/O request into a log. Bucket process 10 may write 406 the offset and mapping information of the I/O request into a tree structure. Bucket process 10 may execute 408 garbage collection for the tree structure to reuse the bucket.

In some implementations, bucket process 10 may receive 400, by a computing device, an I/O request. For instance, assume for example purposes only that a user (e.g., user 46) would like to send a request for data (e.g., via computing device 36). In the example, the I/O request (e.g., I/O 15) may be sent by computing device 36 and received 400 by bucket process 10.

In some implementations, when there are write requests from the application layer, it may be sent (via bucket process 10) to multiple CPU cores to be processed, and a new structure may be allocated to trace the I/O request until the I/O is released. In the I/O process, it may be scheduled to be executed on any CPU core. As will be discussed in greater detail, bucket process 10, for write requests, may calculate an I/O fingerprint, where if the same fingerprint is found in a data cache, the metadata count may be updated and directly returned, whereas if the same fingerprint is not found, bucket process 10 may allocate an extent (e.g., request I/O size) from the currently used bucket, where allocation offset may be close to the last allocation. If the current offset plus the allocation length exceeds the bucket boundary, bucket process 10 may allocate space from the selected free bucket.

Bucket process 10 may write the offset, mapping, and extent information of the I/O request into a log, and may wait for the log write to complete. The offset and mapping information may be inserted into a B tree structure, and may identify its state as dirty. In the B tree, bucket process 10 may check to see if there is an overlap area, and if overlap exists, bucket process 10 may delete the previous mapping, and split the mapping which previously exists may be re-inserted into the B tree, ensuring the uniqueness of the data in the SSD cache. Bucket process 10 may create the I/O request, fill in the bio fields, write the I/O request to the newly allocated space, and submit the request to the SSD device. When the I/O request is complete, bucket process 10 may notify the completion of the I/O request to upper layers in the stack. In some implementations, the I/O may be scheduled to execute on any CPU, allowing concurrent execution of multiple I/O requests, implementing a multi-core parallel processing I/O.

For read I/Os, bucket process 10 may first look up the data in the cache (via the fingerprint), and if there is a hit, then the requested data may be directly returned, and if there is a miss, bucket process 10 may search the B tree by the sector and length, looking up the corresponding extent if it exists in the B tree. Generally, there may be three cases (e.g., partial, complete, none). If all the data exists in the SSD cache, bucket process 10 may construct the I/O requests according to the mapping, read the data from the SSD cache, and once complete, may return the I/O to the requesting application.

For instance, with a partially hit case, bucket process 10 may split the I/O request according to the mapping to create the I/O request, which may then be submitted to the SSD. With a miss, bucket process 10 may create an I/O request and submit it to the backend storage device (e.g., disk). When the two part I/O is complete, the I/O may be sent to the application. At the same time, data read from the disk (or other storage device) may be written to the SSD, and the mapping inserted into the B tree. If the mapping in the B tree needs to merge, bucket process 10 may do so.

Figure 5:
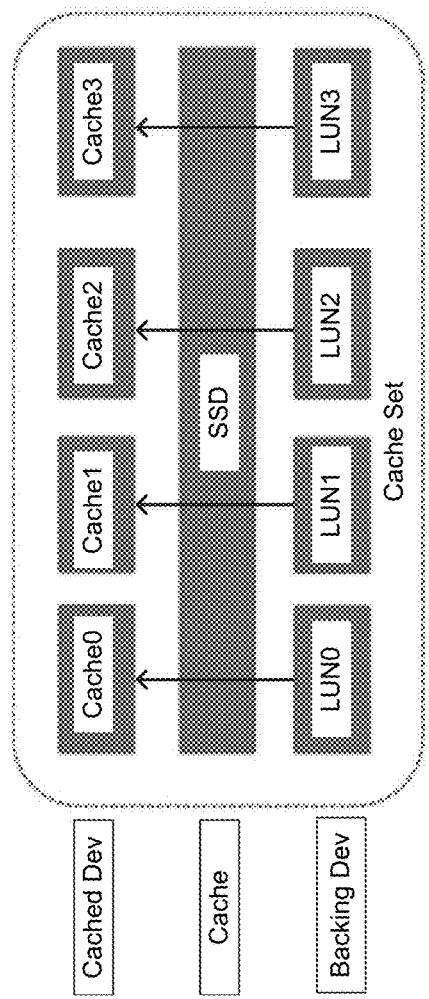
FIG. 5 is an example diagrammatic view of an example cache device layer structure according to one or more example implementations of the disclosure.

Referring at least to the example implementation of FIG. 5, an example cache device layer structure 500 is shown. In the example, cache device layer structure 500 may be designed according to the SSD characteristics. Space may be allocated by any bucket size. The cache data may be managed by bucket process 10 using a B tree and a log, with any size extent (e.g., 512B-2M) that may be saved in the cache, which may reduce the cost of random writes. The bucket may be filled in sequential order, and may be reused when it is set to an invalid status. The use of the bucket may support write direct and write back strategies, and the data may still be reliable when the system has an abnormal shutdown, as successful writes are only acknowledged when the data is completely written back to the backend. Bucket process 10 may cache the vast majority of write requests, and then write the dirty data back to the backend storage devices by index.

In some implementation, as noted above, bucket process 10 may allocate 402 a bucket for the I/O request. For instance, the cache device may be divided into a plurality of buckets according to the bucket size. In some implementations, the size of the bucket may be set to the same size as the SSD erase size (e.g., 128 k~2M+, with an example default being set at 512 k). Each bucket may have a priority number (e.g., 16 bit priority), and every time it may increase when a hit occurs. The priority number of all buckets may periodically decrease, and the bucket which is not commonly used may be reclaimed. The priority number may be used to help achieve a least recently used (LRU) replacement. The bucket may have an 8 bit generation, which may be used to invalidate the bucket.

In some implementations, the allocation 402 of the bucket may be a sequential allocation. For instance, the space allocation in the bucket may be a sequential allocation, where only the current allocation offset is saved, and the next space allocation starts from the current offset, so that the application layer of the random I/Os may be converted into sequential writes. In some implementations, bucket process 10 may implement one or more priority rules to cache data, e.g., 1) prior I/O continuity, even though the I/O may come from different producers; and 2) considering the correlation of multiple I/Os, the data from the same process may be cached to the same bucket.

For bucket allocation 402, bucket process 10 may determine if there is a free bucket in the free list, which may be returned if it exists. If there is no available bucket, bucket process 10 may enter a wait state until there is an available bucket. Bucket process 10 may include a "wake up allocation thread" which may update bucket-related information. If the bucket is allocated for metadata, bucket process 10 may set the bucket to, e.g., GC_MARK_METADATA, which may not be able to be arbitrarily reclaimed. Otherwise, the bucket may be set to be reclaimable.

Bucket process 10 may also include an "allocation thread", where if the allocation free_inc list is not empty, may obtain a bucket from the free_inc list, where it may be added to the free list so that the allocation function is guaranteed to have the available bucket, and may wake up the thread waiting for the bucket. If the free list is full, the allocation thread may be blocked.

In some implementations, if the free_inc is empty, bucket process 10 may need to invalidate a bucket which is currently being used. Bucket process 10 may do so by, e.g., traversing each bucket in a cache disk. If the bucket is not reclaimable, bucket process 10 may add the bucket to the heap, using a comparison function (e.g., bucket_max_cmp), to compare the bucket priority. Bucket process 10 may sort each bucket by priority from small to large heap (e.g., bucket_min_cmps), and may take a bucket from the heap, call, e.g., sarw_invalidate_one_bucket, until the free_inc list is full. If the free_inc list is not full, bucket process 10 may wake up the garbage collection thread (discussed further below) and update the information stored on the disk.

In some implementations, bucket process 10 may write 406 the offset and mapping information of the I/O request into a tree structure. In some implementations, the tree structure may include a B+ tree, where the B+ tree may include a bkey, and where the bkey may store the mapping information between the data in the solid state device and the data in a backend device. For instance, and referring at least to the example implementations of FIGS. 6-7, an example data structure 600 of the mapping between SSD and HDD, and an example B tree structure 700 is shown. In the example, bucket process 10 may use a B+TREE to manage the buckets, where the key structure in the B tree may be a bkey, which may save the mapping between data in the cache device and the data in backend device.

Figure 6:
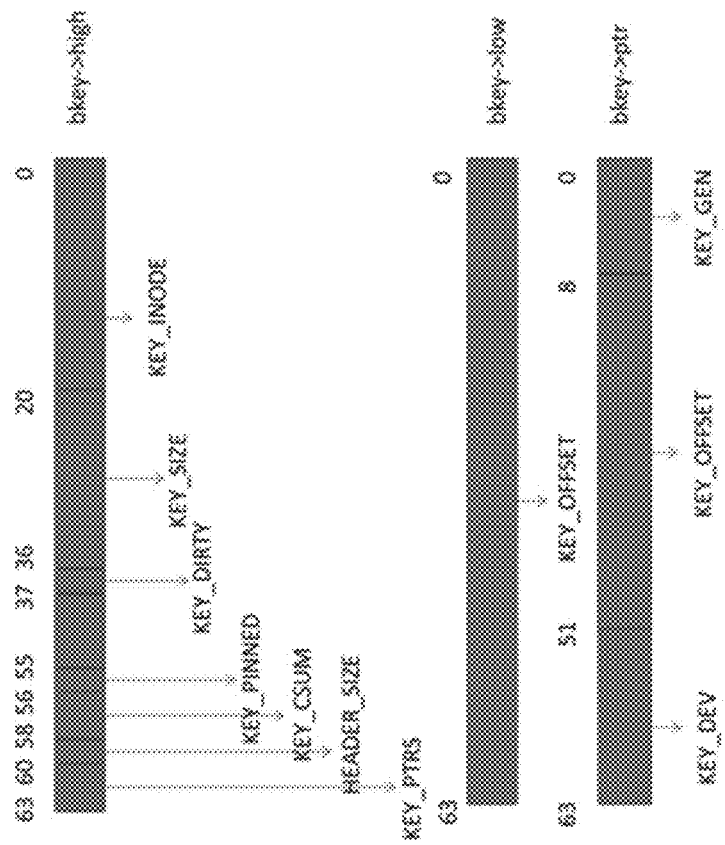
FIG. 6 is an example diagrammatic view of an example data structure according to one or more example implementations of the disclosure.

In FIG. 6, the KEY_SIZE may represent the size of the cache data, the KEY_OFFSET may be the end address of the data area on the HDD which is cached in SSD, and PTR_OFFSET may include the cache data starting address in the cache device.

Figure 7:
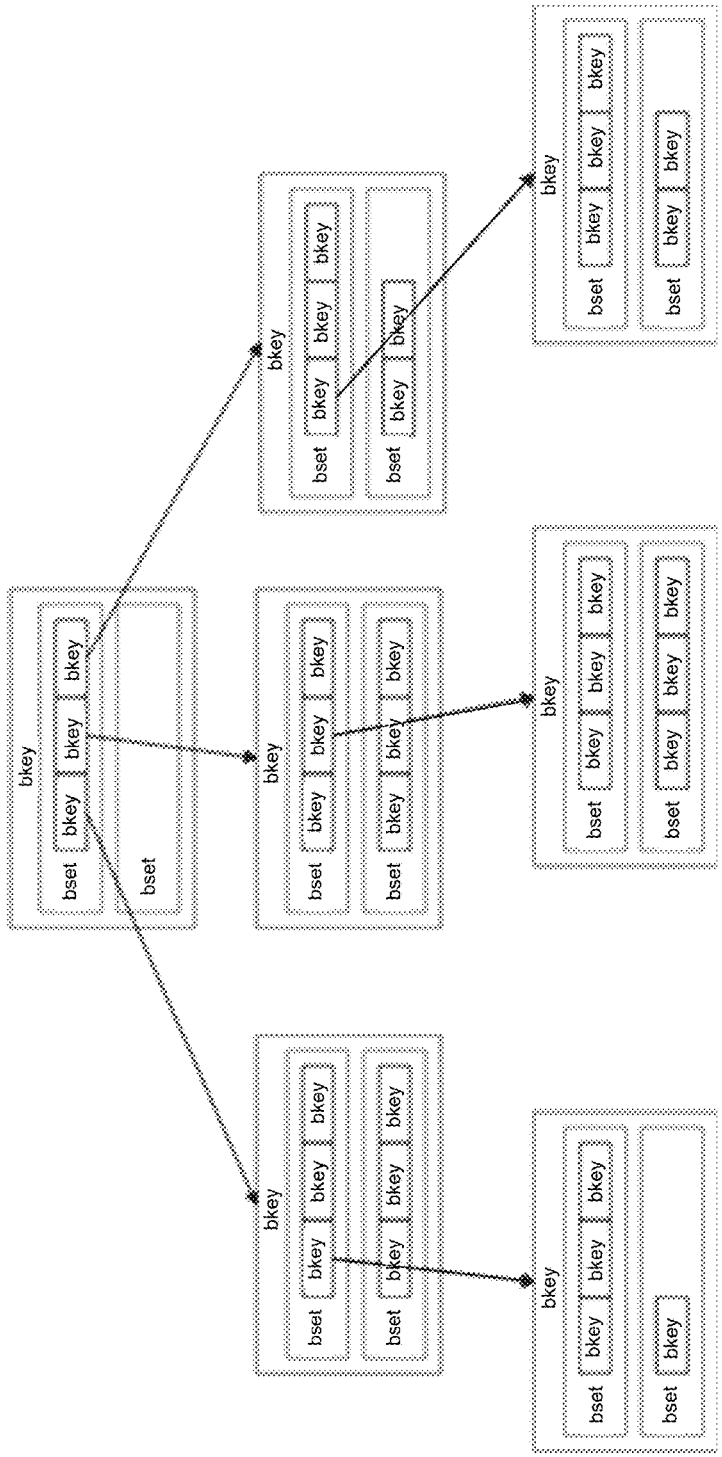
FIG. 7 is an example diagrammatic view of an example example B tree structure according to one or more example implementations of the disclosure.
Figure 8:
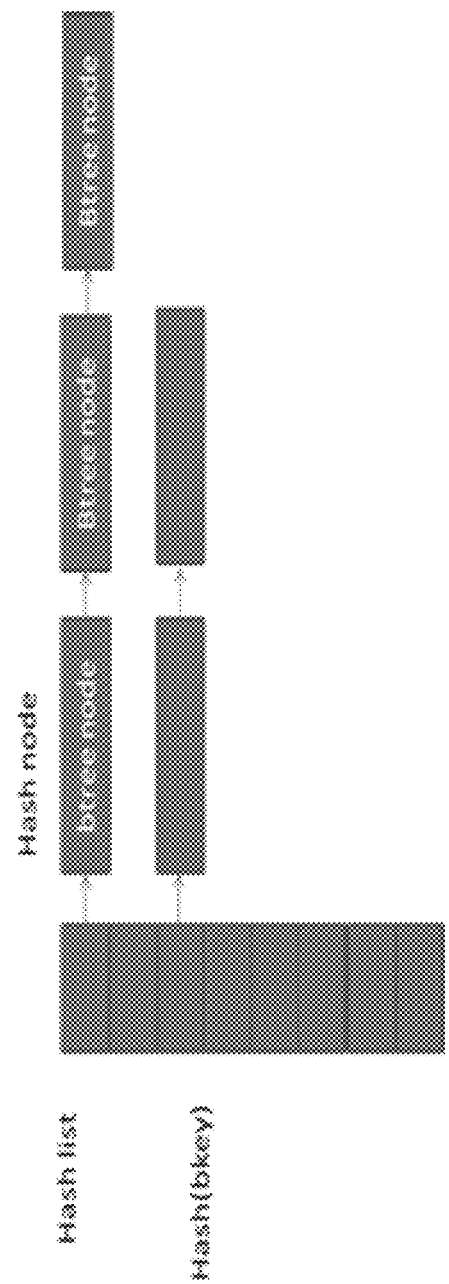
FIG. 8 is an example diagrammatic view of an example B tree structure in memory according to one or more example implementations of the disclosure.
Figure 9:
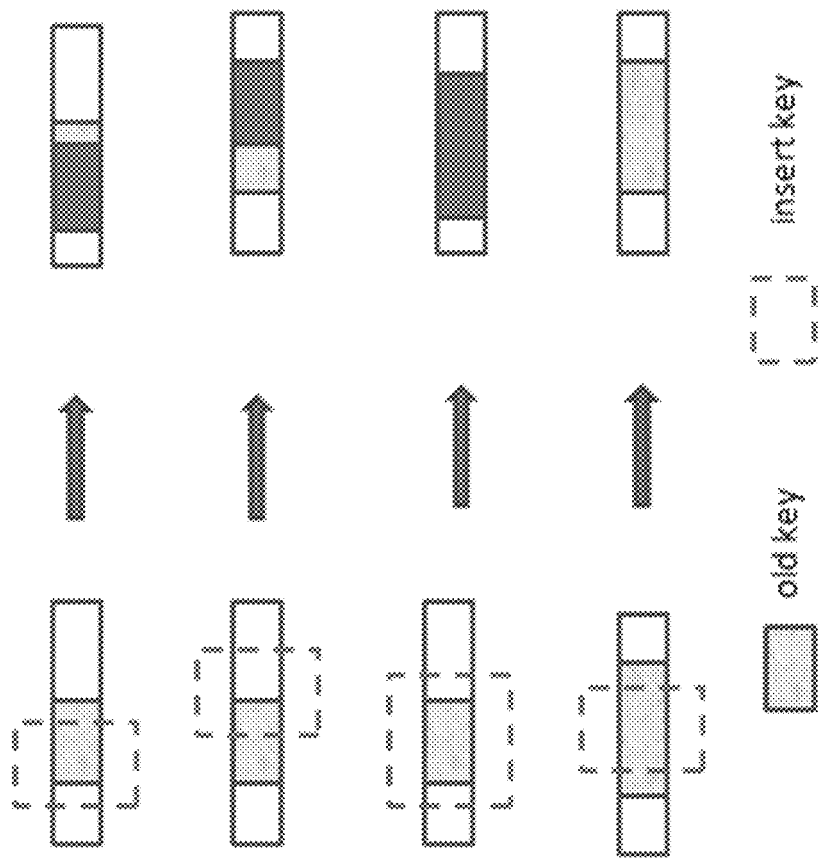
FIG. 9 is an example diagrammatic view of an example key structure with overlap according to one or more example implementations of the disclosure.

In FIG. 7, the mapping may be managed by the B tree, where in the example, there may be, e.g., four BSET in the B tree node, and the bkey may be sorted in the BSET. Each BTREE node may be identified by the bkey, which may be the largest bkey in its child nodes. The bkey in the non-leaf may be used to find its sub-node, calculate a hash, and then find the btree node in the hash table. The actual mapping may store the bkey in the leaf node (e.g., cache data and corresponding location on the HDD may be found by these keys may be found in a B tree structure 800 in memory, shown by example in FIG. 8.

In some implementations, bucket process 10 may write 404 an offset and mapping information of the I/O request into a log. For instance, the log (e.g., journal) is typically used to keep consistency, in some implementations may be used instead to improve performance. Each write operation may cause bucket process 10 to update metadata (e.g., the bset). To help reduce the overhead, the journal may include inserted keys, sorted by the insertion time, and may only record updates in the leaf nodes and when non-leaf nodes have been persisted in a split. Thus, in some implementations, the log may record each write operation after the data is written, and in the crash recovery time, the key may be reinserted according to the log.

An example function (e.g., sarw_data_insert keys) that may insert the key to leaf node in the B tree, and write the keys to the journal may include the following example steps:

If the key in the keylist is capable of being filled in the current buffer in the journal, then return, else there may be two situations, where, e.g., 1) current journal is not full, and then execute a journal_try_write function and try to write part of the journal, or 2) execute a journal_reclaim function and try to reclaim the journal space. Bucket process 10 may copy the keys to the journal cache, and if (parent) tries to persist in the journal, e.g., journal_try_write, else delay, e.g., 30 seconds to call the log flush thread.

For the log write process, if the journal is full, bucket process 10 may call journal_reclaim, then find the oldest B tree node and write it to disk. Bucket process 10 may insert it into the journal and update it to journal area in disk. For the log reclaim, the space used for the log/journal may be limited. When the journal is near full, the old journal may need to be discarded. As there is provided a limited area to store the journal, when the area is full, the oldest bucket may need to be replaced. The discarded journal index may be discard_idx. Example pseudo code for selecting which bucket to discard may be, e.g.:

```
last_seq =last_seq(&c->journal);
for_each_cache(ca, c, iter) {
struct journal_device *ja =&ca->journal;
while (ja->last_idx !=ja->cur_idx &&
ja->seq[ja->last_idx] <last_seq)
ja->last_idx =(ja->last_idx + 1) %
ca->sb.njournal_buckets;
}
```

In some implementations, bucket process 10 may execute 408 garbage collection for the tree structure to reuse the bucket. For example, the garbage collection goal may be to reuse buckets. In the Initialization stage, the function may be to judge if the used sector of the bucket which the key points to is less than a specific threshold. If it is less, garbage collection may be executed 408, otherwise, the bucket may not be reclaimed.

Garbage collection may be normally triggered by invalidated buckets, using by example a moving_gc_keys keybuf which may be maintained by red and black trees to store the keys which could be reclaimed. Bucket process 10 may scan the entire B tree, judge which bkeys may be candidates for garbage collection, and the keys that could be candidates for garbage collection may be moved to the moving_gc_keys bkey list. Bucket process 10 may read data from the SSD by the bkey, and then may write the data to HDD. After the writing complete, bucket process 10 may move the key from the moving_gc_keys list.

Bucket process may merge the B tree nodes that contain fewer keys to release the bucket. The generation of the bucket to which the leaf node points to may be less than key generation, in which case the bucket may be reclaimed. Bucket process 10 may wake up the garbage collector thread of bucket process 10 when the inc_free list is not full. For example, bucket process 10 may, for example: set a flag to indicate that garbage collection is working, and traverse the B tree to analyze which buckets may be reclaimed. Bucket process 10 may set the bucket flag to metadata, and calculate the bucket number that may be reclaimed. Bucket process 10 may wake the allocation thread, and complete the actual garbage collection.

Generally, if bucket->gen>key->gen, then there is no need to do garbage collection. Bucket process 10 may calculate the key->gen-bucket->gen max value, and update garbage collection information. Bucket process 10 may traverse each node in the B tree, and if the key in node(one-four) take up less space, bucket process 10 may merge the B tree node to reduce the use of the bucket.

Bucket process 10 may traverse the bucket in the cache, and if it is used for metadata or the data is equal to the bucket size, bucket process 10 may fill the moving_gc_keys list. Bucket process 10 may obtain the elements from the moving_gc_keys list, create a new bio, fill the bio, read the data from the specific position in the SSD, and write it to another position in the SSD.

In some implementations, regarding writeback mechanisms, all writes may be cached first, and then dirty data may be flushed in the background by bucket process 10. The cache data in a bucket may correspond to different locations on the HDD, or even in different HDDs. The bkey may be a unit to writeback, not a bucket. Each cache may be set to have writeback_keys and may record the bkeys that need to be written back. When dirty data (dirty data ratio) needs to be flushed, bucket process 10 may traverse the entire B tree, look up the dirty bkey and insert it into the writeback_keys list (writeback_keys may have a size limit). Bucket process 10 may then sort by disk offset, flush the dirty data to HDD, remove the corresponding bkey from the writeback_keys list, and clear the bkey dirty flag. This may reduce disk head movement, and may improve the efficiency of flush data.

In some implementations, each cached_dev structure may have a member writeback_keys to record writeback keys. Example pseudo code for a writeback thread may be found below for example purposes only:

```
sarw_writeback_thread :
a. if not dirty or writeback is not running, the thread yield CPU.
b. searched_full_index = refill_dirty(dc);
c. call read_dirty, the function traverse writeback_keys,  the bio
structure is filled, then read data from cache device.
   io->bio.bi_bdev = PTR_CACHE(dc->disk.c, &w->key, 0)->bdev;
   io->bio.bi_rw = READ;
call read_dirty_submit submit read request, after read complete, call
write_dirty
Writing data to HDD device.
d. In order to let the writeback not be too intensive, call delay =
writeback_delay (DC, KEY_SIZE (&w->key)) to calculate the delay
time between the two write, the next cycle: call
schedule_timeout_uninterruptible delay for a period of time.
```

-continued

```
sarw_writeback_thread :
refill_dirty:
    a If(dc->partial_stripes_expensive)
        sarw_refill_keybuf(dc->disk.c buf, &KEY(dc->disk.id,
next_stripe  *  dc->disk.stripe_size,0)
        b.  structkeybuf *buf = &dc->writeback_keys;
            struct bkey end = KEY(dc->disk.id, MAX_KEY_OFFSET, 0);
            rasw_refill_keybuf(dc->disk.c, buf, &end, dirty_pred);
    rasw_refill_keybuf(dc->disk.c, buf, &KEY(dc->disk.id,
next_stripe  *  dc->disk.stripe_size,0)
sarw_refill_keybuf may traverse the B tree leaf node to fill the keybuf,
and add dirty key to keybuf.
```

In some implementations, for a data reading process, bucket process 10 may submit bio directly to the hard disk and may return if there is no corresponding cache. If there is cache device, according to the bio, bucket process 10 may create a structure search s. For example, bucket process 10 may call check_should_bypass, and check if the bio should be bypassed. If the bio is a read request, bucket process 10 may call cached_dev_read, and if the bio is a write request, bucket process 10 may call cached_dev_write.

In some implementations, for a bypass check, if the bio is a discard request or the garbage collection number is greater than CUTOFF_CACHE_ADD, then bypass is true. If the cache is disabled, then bypass is true. If the bio sector is not aligned by block size, then bypass is true. If the cache device is congested, bypass is true. If the I/O is sequential and the I/O size is greater than, e.g., 4M, bypass is true.

In some implementations, bucket process 10 may first search in the B tree to check if there is data in the cache. Bucket process 10 may traverse the leaf nodes in the B tree to look up the bkey, and when the leaf node is reached, may execute the following example and non-limiting procedure:

If the searched key is less than the current key, return MAP_CONTINUE, let the upper layer search the next key. If the key is not in the B tree or only part of the data is in the B tree, call cache_miss function. If the data is in the cache (bkey is B+TREE, and the data range in the key is all in the cache), the data may be directly read from the cache. Bucket process 10 may then set the bucket priority INITIAL_PRIO For a cache_miss: when reading non-metadata and the read-ahead is not disabled, bucket process 10 may calculate the number of sectors that may be pre-read. Bucket process 10 may calculate the key which needs to be added or replaced in the B tree, and submit the key to the B tree. Bucket process 10 may read the data from the HDD, save the bio to iop.bio so that the data may be add to the cache.

When the cache device read is done, and when s->iop.bio is not zero, this may indicate that the new data has been added to the B tree, so bucket process 10 may first copy the data to cache_missbio, and then call sarw_data_insert to update the data to the cache device.

In some implementations, bucket process 10 may determine 410 that overlap exists in the tree structure. For example, and referring at least to the example implementation of FIG. 9, an example key structure 900 with overlap is shown. In the example, the overlap may need to be considered in the cache. The key structure may need to be changed when there exists overlap area, which may be accomplished using the following example and non-limiting pseudo code:

```
k = op->insert_keys.top; bkey_init(k);
    SET_KEY_INODE(k,op->inode);
```

```
    SET_KEY_OFFSET(k,bio->bi_iter.bi_sector);// need
update btree
    if (op->writeback)
        SET_KEY_DIRTY(k,true);
        sarw_keylist_push(&op->insert_keys);
    sarw_data_insert_keys first call sarw_journal to add the keys to
the journal, then call sarw_btree_insert, traverse the keylist, call
sarw_btree_map_leaf_nodes for each
key to insert it to the B tree.
```

Regarding the data writing process, bucket process 10 may check if there is overlap with the writeback area, and if there exists an overlap area, data may not be directly written to disk. If the bio is a REQ_DISCARD request, bypass is true. Bucket process 10 may check if the bio should be writeback, where there may be at least three kinds of cases: (1) Bypass: set s->iop.bio=s->orig_bio; (2) If writeback is open, sarw_writeback_add(dc);s->iop.bio=bio; data does not need to be immediately written back to hard disk, (3) data is written back to hard disk.

For the leaf node, if the B tree node is not dirty, bucket process 10 may delay, e.g., 30 seconds to flush the B tree node. If the B tree node is dirty, and the size of bset exceeds a threshold, bucket process 10 may write the node to disk. For most cases, for performance consideration, the B tree node may not immediately be updated to cache. The journal may guarantee updated data will not be lost.

For the non-leaf node, bucket process 10 may clear the dirty flag and call do_btree_node_write, and update the node to disk. In some implementations, there may be three cases to update the B tree. For example, (1) the inserted key is less than btree->key, directly call btree_insert_key; (2) there is partial overlap with the key in the B tree, non-overlapped partial may be inserted; (3) if it is fully contained in the btree key, no need to insert.

Figure 10:
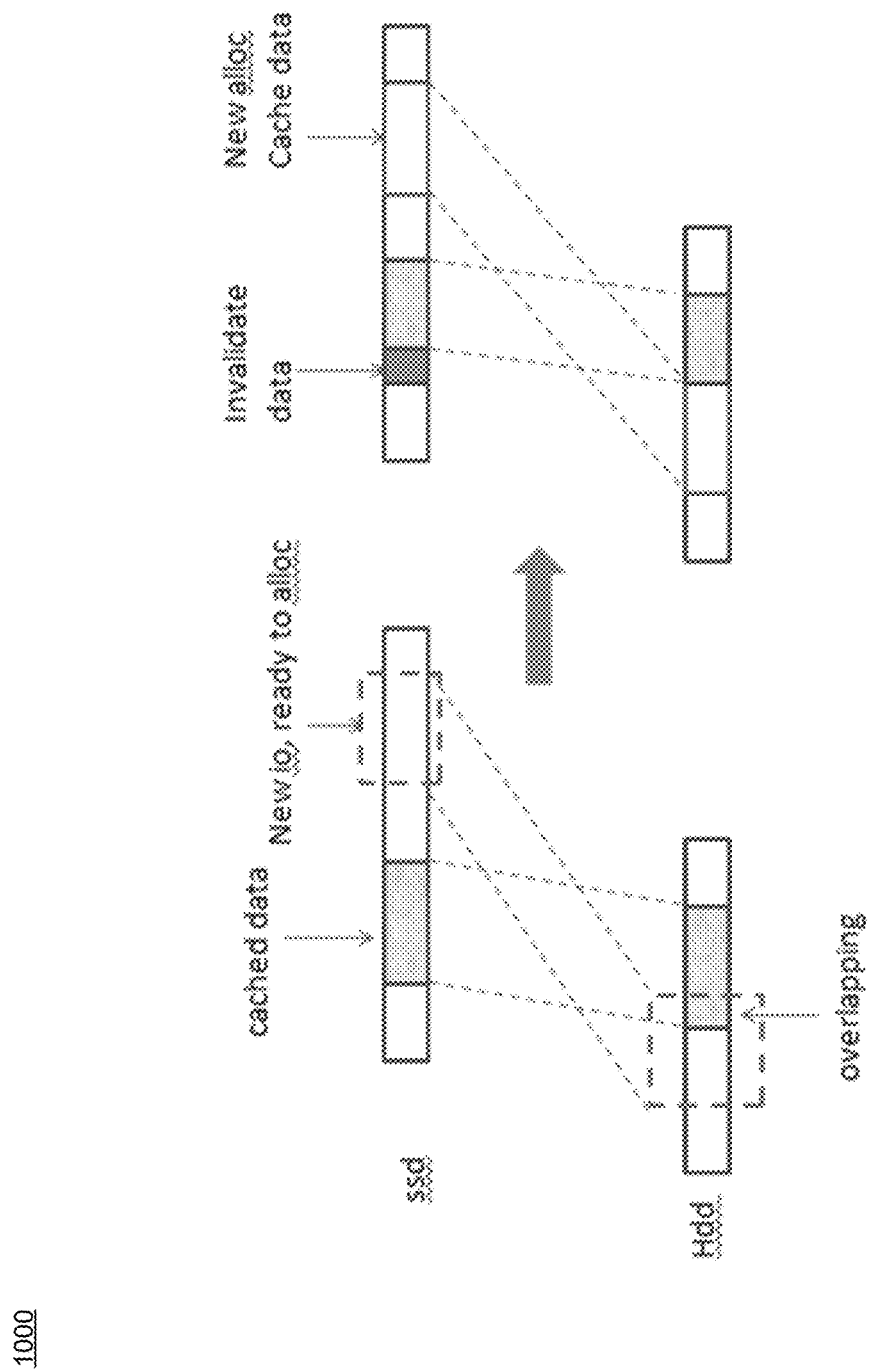
FIG. 10 is an example diagrammatic view of an example overlapping data structure according to one or more example implementations of the disclosure.

When there are new write I/Os, the I/O which corresponds to the data in the HDD may have been partly cached on the SSD. The overlapping may need to be handled for the bkey. The B tree node may be logged, and the B tree node on the disk may overlap because it may have been written at different times. However, the B tree node in memory may not overlap because the inserted bkey may be overlapped with the bkey, then the issue needs to be solved. In addition, the bkeys in the bsets may need to have a merge sort when the B tree node is read from the disk, so bucket process 10 may check the overlap and solve the problem. For instance, and referring at least ot the example implementation of FIG. 10, an example overlapping data structure 1000 is shown. As can be seen from FIG. 10, the original bkey may be modified (e.g., the offset on the SSD and the HDD may be modified, as well as the data size).

In some implementations, bucket process 10 may split 412 the tree structure. For instance, for a B tree split, bucket process 10 may call btree_node_alloc_replacement to duplicate one B tree node and the space may be allocated from the bucket. Bucket process 10 may determine if splits are required, where split=set_blocks(btree_bset_first(n1), block bytes(n1->c))>(btree_blocks(b)*4)/5;

If split if true, in the key insert, bucket process 10 may recursively insert the key into the leaf node. If it needs to be split, bucket process 10 may split 412 it into two nodes, where the maximum key in the two nodes may be transferred to the upper function, and the function in the upper layer may add the key (so as to modify the parent node pointer). If this layer also needs to be split, bucket process 10 may implement the same process as with the previous split process, where the node which is split may be immediately stored to the SSD.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, by a computing device, an I/O request for data from a data cache;
   allocating a bucket for the I/O request;
   calculating an I/O fingerprint associated with the bucket
   determining if a same fingerprint is found in the data cache;
   in response to determining the same fingerprint is not found in the data cache, allocating an extent from the bucket;
   writing an offset and mapping information of the I/O request into a log;
   writing the offset and mapping information of the I/O request into a tree structure; and
   executing garbage collection for the tree structure to reuse the bucket.

2. The computer-implemented method of claim 1 wherein the tree structure includes a B+ tree.

3. The computer-implemented method of claim 2 wherein the B+ tree includes a bkey.

4. The computer-implemented method of claim 3 wherein the bkey stores the mapping information between the data in the solid state device and the data in a backend device.

5. The computer-implemented method of claim 1 wherein the allocation of the bucket is a sequential allocation.

6. The computer-implemented method of claim 1 further comprising determining overlap exists in the tree structure.

7. The computer-implemented method of claim 1 further comprising splitting the tree structure.

8. A computer program product residing on a computer readable storage medium having a plurality of instructions stored thereon which, when executed across one or more processors, causes at least a portion of the one or more processors to perform operations comprising:
   receiving an I/O request for data from a data cache;
   allocating a bucket for the I/O request;
   calculating an I/O fingerprint associated with the bucket;
   determining if a same fingerprint is found in the data cache;
   in response to determining the same fingerprint is not found in the data cache, allocating an extent from the bucket;
   writing an offset and mapping information of the I/O request into a log;
   writing the offset and mapping information of the I/O request into a tree structure; and
   executing garbage collection for the tree structure to reuse the bucket.

9. The computer program product of claim 8 wherein the tree structure includes a B+ tree.

10. The computer program product of claim 9 wherein the B+ tree includes a bkey.

11. The computer program product of claim 10 wherein the bkey stores the mapping information between the data in the solid state device and the data in a backend device.

12. The computer program product of claim 8 wherein the allocation of the bucket is a sequential allocation.

13. The computer program product of claim 8 wherein the operations further comprise determining that overlap exists in the tree structure.

14. The computer program product of claim 8 wherein the operations further comprise splitting the tree structure.

15. A computing system including one or more processors and one or more memories configured to perform operations comprising:
   receiving an I/O request for data from a data cache;
   allocating a bucket for the I/O request;
   calculating an I/O fingerprint associated with the bucket:
   determining if a same fingerprint is found in the data cache;
   in response to determining the same fingerprint is not found in the data cache, allocating an extent from the bucket;
   writing an offset and mapping information of theI/O request into a log;
   writing the offset and mapping information of the I/O request into a tree structure; and
   executing garbage collection for the tree structure to reuse the bucket.

16. The computing system of claim 15 wherein the tree structure includes a B+ tree.

17. The computing system of claim 16 Therein the B+ tree includes a bkey.

18. The computing system of claim 17 wherein the bkey stores the mapping information between the data in the solid state device and the data in a backend device.

19. The computing system of claim 15 wherein the allocation of the bucket is a sequential allocation.

20. The computing system of claim 15 wherein the operations further comprise splitting the tree structure.

* * * * *